June 3, 1952   G. GARNIER   2,598,780
TELESCOPIC SHAFTING ARRANGEMENT
Original Filed Aug. 9, 1945   2 SHEETS—SHEET 1
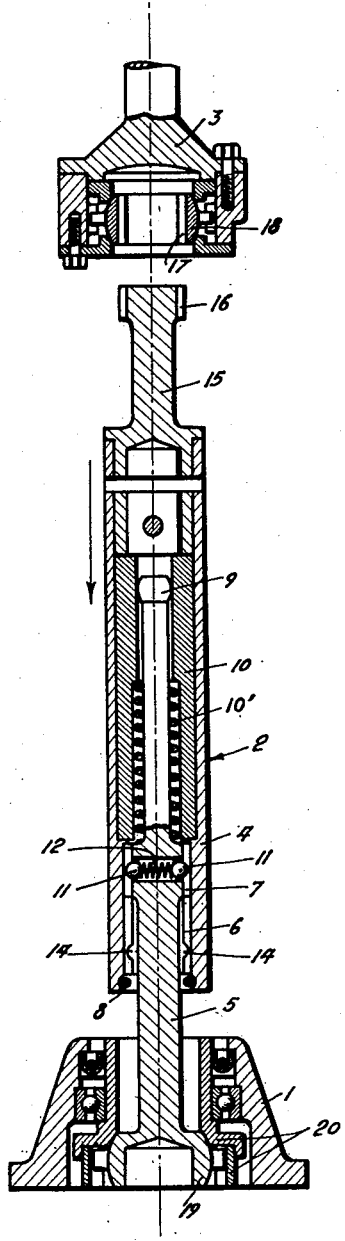
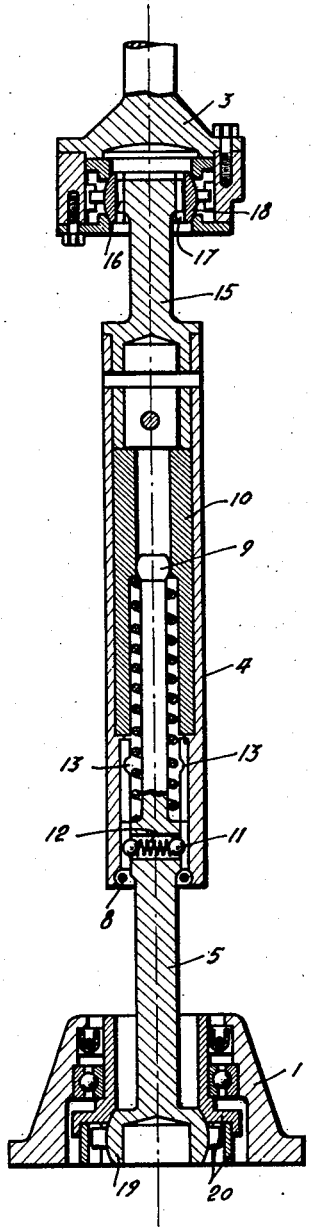
Inventor
G. Garnier June 3, 1952  G. GARNIER  2,598,780
TELESCOPIC SHAFTING ARRANGEMENT
Original Filed Aug. 9, 1945  2 SHEETS—SHEET 2

Patented June 3, 1952

2,598,780

UNITED STATES PATENT OFFICE 2,598,780

TELESCOPIC SHAFTING ARRANGEMENT

Georges Garnier, Paris, France, assignor to Air-Equipment, Paris, France, a French company Original application August 9, 1945, Serial No. 609,826. Divided and this application April 11, 1947, Serial No. 740,774. In France September 7, 1942

Section 1, Public Law 690, August 8, 1946
Patent expires September 7, 1962

15 Claims. (Cl. 64—1)

The subject-matter of this application is divided from the patent application Serial No. 609,826, filed August 9, 1945.

The present invention relates to the problem of the driving of auxiliary parts or apparatuses, for instance on board aircraft. This driving is generally performed through the agency of gear boxes, a Cardan shaft or the like device, forming part or not forming part of the gear box, for connecting the latter with a motor and for allowing thus the gear box and the different auxiliary parts to be driven.

The known gear boxes in which fluted couplings allowing a knee-joint motion connect the ends of this driving shaft with the motor and with the gear box itself respectively, show the drawback of requiring the dismantling of the gear box or of the motor before the driving shaft may be removed in its turn.

The present invention aims chiefly at removing this drawback and has for an object to provide a driving shaft comprising at least at one end longitudinal coupling splines and at least two coaxial sections coupled together, so as to be capable of a longitudinal motion one with reference to the other, means being moreover provided for holding the two sections in a number of selected relative positions. It is thus possible to disconnect the splined end without dismantling any further element; if both ends are splined, it is then possible to remove the shaft without touching the remainder of the transmission system.

This arrangement may be completed by a bearing which is secured to a partition and carries an auxiliary shaft leading to the gear box. Preferably the auxiliary shaft is connected through a Cardan joint with said intermediate bearing and with the gear box and there is associated therewith at least one joint allowing longitudinal sliding and inserted in this connection between the auxiliary shaft and the gear box. In a preferred form of execution this intermediate bearing is provided with two universal-joints rotating integrally together, arranged preferably coaxially and provided each with a splined hole inside which is engaged the end, also splined, of the auxiliary shaft or of the driving shaft, as the case may be, which ends in the hole considered.

The driving shaft comprising sliding sections may thus remain the same for a given driving frame whatever may be the position occupied by the gear box to the rear of the fire wall.

Appended drawings show by way of example and by no means in a limitative sense several forms of execution of the shafting arrangements adapted to drive auxiliary parts on board aircraft and designed in accordance with the above disclosed features.

In said drawings:

Figs. 1 and 2 are axial cross-sections of a telescoping shaft driving a gear box carrying auxiliary parts, said shaft being illustrated in its retracted position in Fig. 2 and in its extended position in Fig. 1.

Figure 3:
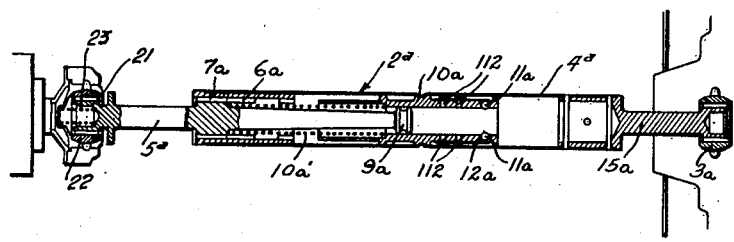
Figs. 3 and 4 are views similar to Figs. 1 and 2 of a modified form of execution of the telescoping shaft.

In the form of execution of Figs. 1 and 2, only the nose 1 of the gear box has been shown and through this nose passes the driving shaft 2 driven by the transmission means 3 of the motor. This shaft is constituted in the example shown by two coaxial sections 4 and 5 of which one, 4, is tubular and surrounds the other to which it is slidingly coupled through inner splines 6 provided at one of its ends and meshing with shorter splines 7 provided on an enlargement of the section 5. At this same end of the section 4 is arranged a ring 8 or any other suitable stop adapted to prevent the section 5 from passing out of the section 4. The section 5 extends inside the section 4 beyond the enlargement carrying the splines 7 and carries a guiding head 9 sliding inside the bore provided in an aluminum lining 10 fitted in the steel section 4. A spring 10′ has its ends bearing respectively against the lining 10 and against the enlargement of the section 5 and urges apart from one another the sections 4 and 5 and a locking device holding the two sections as desired in the extreme positions corresponding to a minimum and a maximum length for the shaft is constituted by balls 11 housed in a recess passing radially through the enlargement of the section 5; these balls are urged outwardly by a spring 12 inserted between said balls and which cooperate with two series 13, 14 of notches in the section 4. The end of the tubular section 4 opposed to the end carrying the splines 6 is secured to an end piece 15 carrying further splines 16 adapted to engage corresponding splines 17 in the axial bore of a spherical inner member 18 of a universal joint forming a permanently-attached part of the transmission means 3 of the motor. The other section 5 carries in its turn a universal-joint 19 the cup-shaped bearings for which are journaled in the nose 1 of the gear box.

Obviously such a shaft as described may be instantaneously disconnected with reference to the motor, as apparent from Figs. 1 and 2 while remaining secured to the gear box through the stationary universal-joint 19.

Figure 4:
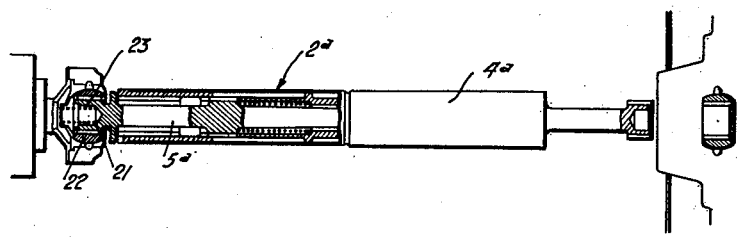

Figs. 3 and 4 show a telescopic shaft constituted like the shaft 4—5 described hereinabove with a few modifications in form. In the embodiment shown in Figs. 3 and 4, the telescopic shaft comprises two coaxial sections 4a and 5a, but the section 5a instead of carrying a universal-joint, carries like the section 4a a splined head 21 engaging the axial bore, also splined, of an universal-joint 22. The shaft thus constituted is disconnectable at both ends. The section 5a carries a guiding head 9a sliding inside the bore provided in the aluminium lining 10a fitted in the steel section 4a. A spring 10'a has its ends bearing respectively against the lining 10a and against an enlargement of the section 5a and urges apart from one another the sections 4a and 5a. A locking device, for holding the two sections in the position corresponding to a minimum length for the shaft, is constituted by balls 11a housed in recesses passing radially through the lining 10a; said balls are urged inwardly, by the free ends of laminated springs 12a riveted at 112 on the lining 10a, and cooperate with a circular notch provided in the head 9a for locking the two members in a selected position. The tubular member 4a is slidingly coupled with member 5a through inner splines 6a provided at one of its ends and meshing with outer splines 7a provided on an enlargement of the section 5a. Opposite its splined end, the tubular member is secured to a splined end piece 15a adapted to be connected to the transmission means 3a. For holding the shaft longitudinally in place, a spring 23 is arranged inside the head 21 and urges it axially while bearing against the bottom of the spherical socket of the universal-joint 22.

Figure 5:
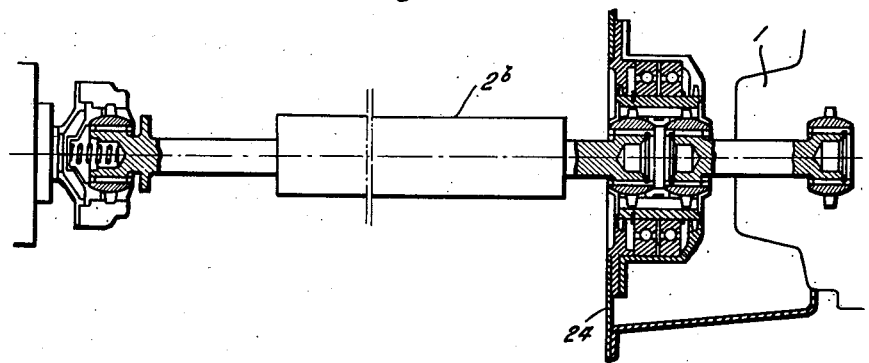
Figs. 5 and 6 show, partly in elevation and partly in axial cross-sectional view, the combination of an intermediary bearing secured to the fire wall with the telescoping shaft.
Figure 6:
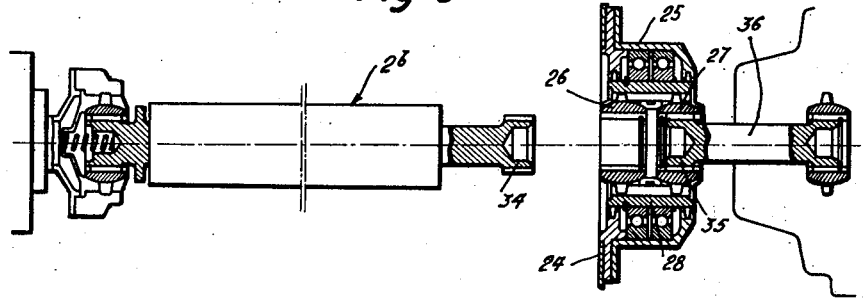

In Figs. 5 and 6 the gear-box 1 is not secured to the fire-wall 24, but is placed at any desired distance behind it. In the form of execution shown of a connection improved in accordance with the invention, between the motor and the gear-box, the Cardan shaft 2b preferably of the type disclosed hereinabove, leads to an intermediate bearing 25 the two coaxial universal joint-ball members 26 and 27 of which are arranged inside a common sleeve 28 the inner splines 29 of which engage the radial outer teeth 30 on the ball-members 26 and 27 the bearing cups on which are secured to this sleeve 28. This bearing 25 is secured to the fire-wall 24, while the splined head 34 of the shaft 2b engages the universal joint-ball member 26 and the splined head 35 of an auxiliary shaft 36 engages the ball-member 27, the opposite head, also splined, of said auxiliary shaft ending at the universal-joint 37 of the gear-box 1a.

Of course the invention is by no means limited to the details of execution shown or described which have been given out solely by way of example.

What I claim is:

1. A telescopic shafting arrangement for connecting a driving unit with a driven unit, comprising a tubular member one end of which is provided with inner splines, an end piece secured to said tubular member at the non splined end of the latter and adapted to be operatively engaged by one of the said units, a second member provided with outer splines adapted to slidingly engage the inner splines of said tubular member, a disconnectable ball joint arrangement operatively connected to the second member, an extension rigid with the second member and having an enlargement provided at its end, a lining inserted inside the non splined part of the tubular member adapted for guiding said enlargement, a locking device fixed on said lining for cooperating with the enlargement and for axially locking the two members in at least one selected position and a spring located inside the tubular member and resting on the lining and on the second member so as to yieldingly push said second member with reference to the tubular member.

2. A telescopic shafting arrangement as in claim 1, wherein the disconnectable ball joint arrangement comprises a splined head forming one piece with the second member and a universal joint having a splined axial bore for receiving said splined head.

3. A telescopic shafting arrangement as in claim 1, further having an auxiliary shaft, a fire wall and a stationary bearing secured to said wall with two coaxial knee-joints adapted to rotate in unison round their axis and provided each with a splined hole registering from one knee-joint to the other and carrying respectively the free end of the end piece and one end of the auxiliary shaft, so that said end piece and the auxiliary shaft are pivoted to each other and rotate in unison.

4. A telescopic shafting arrangement for connecting a driving unit with a driven unit, comprising a tubular member one end of which is provided with inner splines, an end piece secured to said tubular member at the non splined end of the latter for operatively connecting the said tubular member with one of said units, a second member provided with outer splines adapted to slidingly engage the inner splines of said tubular member, a second end piece secured to said second member, opposite to the first end piece, for operatively connecting the second member to the other unit, an extension provided on the second member and extending inside the tubular member to be guided by said tubular member.

5. A telescopic shafting arrangement as in claim 4, further comprising a head secured at the free end of said extension and adapted to be guided by the tubular member.

6. A telescopic shafting arrangement as in claim 4, further comprising a spring located inside the tubular member and resting on said tubular member and on the second member so as to yieldingly push said second member with reference to the tubular member.

7. A telescopic shafting arrangement as in claim 4, further comprising at least one locking device stationary with reference to the tubular member for cooperating with the said extension and for axially locking the two members.

8. A telescopic shafting arrangement as in claim 4, wherein at least one of the end pieces comprises splines and the corresponding unit comprises splines adapted for operatively engaging the splines of said end piece.

9. A telescopic shafting arrangement as claimed in claim 8, further comprising a spring located inside the end piece and the corresponding unit for holding the shaft longitudinally in place with reference to said unit.

10. A telescopic shafting arrangement as claimed in claim 4 further comprising a locking device stationary with reference to one of the two members for axially locking said members in at least one selected position.

11. A telescopic shafting arrangement as claimed in claim 10, wherein the locking device comprises balls housed in a recess passing radially through the second member, spring means inserted between said balls for urging outwardly the balls and notches provided inside the tubular member for cooperating with said balls.

12. A telescopic shafting arrangement as claimed in claim 4, further comprising a locking device stationary with reference of one of the two members for axially locking said members in at least one selected position, said locking device being located at the splined end of the tubular member.

13. A telescopic shafting arrangement as claimed in claim 4, further comprising a locking device stationary with reference of one of the two members for axially locking said members in at least one selected position, said locking device being located at the end of the tubular member, opposite the splined end of said member.

14. A telescopic shafting arrangement as claimed in claim 4, further comprising a lining integral with the tubular member and adapted for guiding the extension provided on the second member of the shaft.

15. A telescopic shafting arrangement as claimed in claim 4, further comprising a lining integral with the tubular member and adapted for guiding the extension provided on the second member of the shaft, and a locking device fixed on said lining for axially locking said members in at least one selected position.

GEORGES GARNIER.

REFERENCES CITED

The following references are of record in the file of this patent:

UNITED STATES PATENTS

| Number | Name | Date |
|---|---|---|
| 935,885 | Blake | Oct. 5, 1909 |
| 1,165,031 | Stahlnacka | Dec. 21, 1915 |
| 1,337,378 | Winskas | Apr. 20, 1920 |
| 1,381,900 | Barnes | June 21, 1921 |
| 1,881,609 | Huwe | Oct. 11, 1932 |
| 2,291,593 | Hubbard | July 28, 1942 |

FOREIGN PATENTS

| Number | Country | Date |
|---|---|---|
| 16,241 | Switzerland | Mar. 8, 1898 |